United States Patent
Sahounov

[11] Patent Number: 6,083,061
[45] Date of Patent: Jul. 4, 2000

[54] NONRESONANT BOAT MOTOR

[76] Inventor: Nikola P Sahounov, 226 Eaglewood Boulevard, Mississauga, Ontario, Canada, L5G 1W1

[21] Appl. No.: 09/324,640

[22] Filed: Jun. 3, 1999

[51] Int. Cl.[7] .................................................. B63H 16/20
[52] U.S. Cl. ................................................ 440/26; 440/52
[58] Field of Search .................................. 440/6, 13, 14, 440/21, 26, 28, 31, 52; 464/77, 100

[56] References Cited

U.S. PATENT DOCUMENTS

| | | | |
|---|---|---|---|
| 621,136 | 3/1899 | Rasmussen | 464/77 |
| 2,273,815 | 2/1942 | Bevington | 440/28 |
| 2,360,157 | 10/1944 | Olson | 464/77 |
| 2,841,000 | 7/1958 | Parks et al. | 464/77 |
| 3,747,555 | 7/1973 | Lay | 440/26 |

*Primary Examiner*—Stephen Avila

[57] ABSTRACT

A nonresonant boat motor for imparting motion to a boat without generating a substantial level of sound. The nonresonant boat motor includes a spiral spring coupled to an axle assembly, a propeller shaft coupled to the axle assembly, a ratchet assembly for providing tension in the spring, and an axle rotation control assembly.

18 Claims, 3 Drawing Sheets

6,083,061

NONRESONANT BOAT MOTOR

BACKGROUND OF THE INVENTION

1. Field of the Invention

The present invention relates to motors and more particularly pertains to a new nonresonant boat motor for imparting motion to a boat without generating a substantial level of sound.

2. Description of the Prior Art

The use of motors is known in the prior art. More specifically, motors heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,994,368; U.S. Pat. No. 4,371,058; U.S. Pat. No. 2,915,906; U.S. Pat. No. 1,776,360; U.S. Pat. No. 1,178,947; and U.S. Pat. No. Des. 289,170.

While these devices fulfill their respective, particular objectives and requirements, the aforementioned patents do not disclose a new nonresonant boat motor. The inventive device includes a spiral spring coupled to an axle assembly, a propeller shaft coupled to the axle assembly, a ratchet assembly for providing tension in the spring, and an axle rotation control assembly.

In these respects, the nonresonant boat motor according to the present invention substantially departs from the conventional concepts and designs of the prior art, and in so doing provides an apparatus primarily developed for the purpose of imparting motion to a boat without generating a substantial level of sound.

SUMMARY OF THE INVENTION

In view of the foregoing disadvantages inherent in the known types of motors now present in the prior art, the present invention provides a new nonresonant boat motor construction wherein the same can be utilized for imparting motion to a boat without generating a substantial level of sound.

The general purpose of the present invention, which will be described subsequently in greater detail, is to provide a new nonresonant boat motor apparatus and method which has many of the advantages of the motors mentioned heretofore and many novel features that result in a new nonresonant boat motor which is not anticipated, rendered obvious, suggested, or even implied by any of the prior art motors, either alone or in any combination thereof.

To attain this, the present invention generally comprises a spiral spring coupled to an axle assembly, a propeller shaft coupled to the axle assembly, a ratchet assembly for providing tension in the spring, and an axle rotation control assembly.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new nonresonant boat motor apparatus and method which has many of the advantages of the motors mentioned heretofore and many novel features that result in a new nonresonant boat motor which is not anticipated, rendered obvious, suggested, or even implied by any of the prior art motors, either alone or in any combination thereof.

It is another object of the present invention to provide a new nonresonant boat motor that may be easily and efficiently manufactured and marketed.

It is a further object of the present invention to provide a new nonresonant boat motor that is of a durable and reliable construction.

An even further object of the present invention is to provide a new nonresonant boat motor which is susceptible of a low cost of manufacture with regard to both materials and labor, and which accordingly is then susceptible of low prices of sale to the consuming public, thereby making such nonresonant boat motor economically available to the buying public.

Still yet another object of the present invention is to provide a new nonresonant boat motor which provides in the apparatuses and methods of the prior art some of the advantages thereof, while simultaneously overcoming some of the disadvantages normally associated therewith.

Still another object of the present invention is to provide a new nonresonant boat motor for imparting motion to a boat without generating a substantial level of sound.

Yet another object of the present invention is to provide a new nonresonant boat motor which includes a spiral spring coupled to an axle assembly, a propeller shaft coupled to the axle assembly, a ratchet assembly for providing tension in the spring, and an axle rotation control assembly.

Still yet another object of the present invention is to provide a new nonresonant boat motor that is substantially silent compared to combustion engines commonly used for boating.

Even still another object of the present invention is to provide a new nonresonant boat motor that permits near silent movement of the boat.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
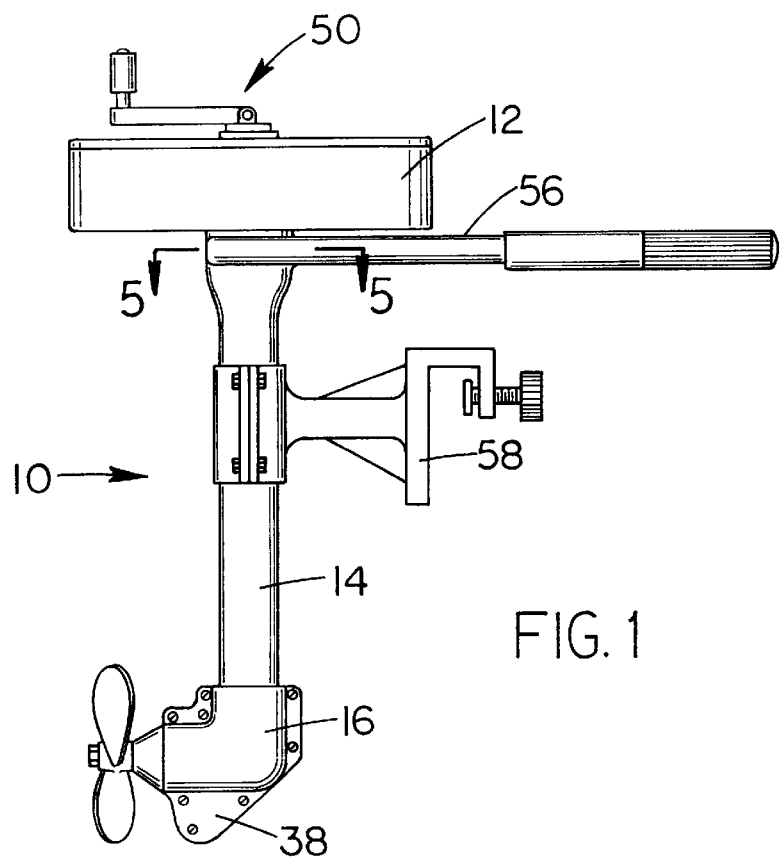
FIG. 1 is a side view of a new nonresonant boat motor according to the present invention.
Figure 2:
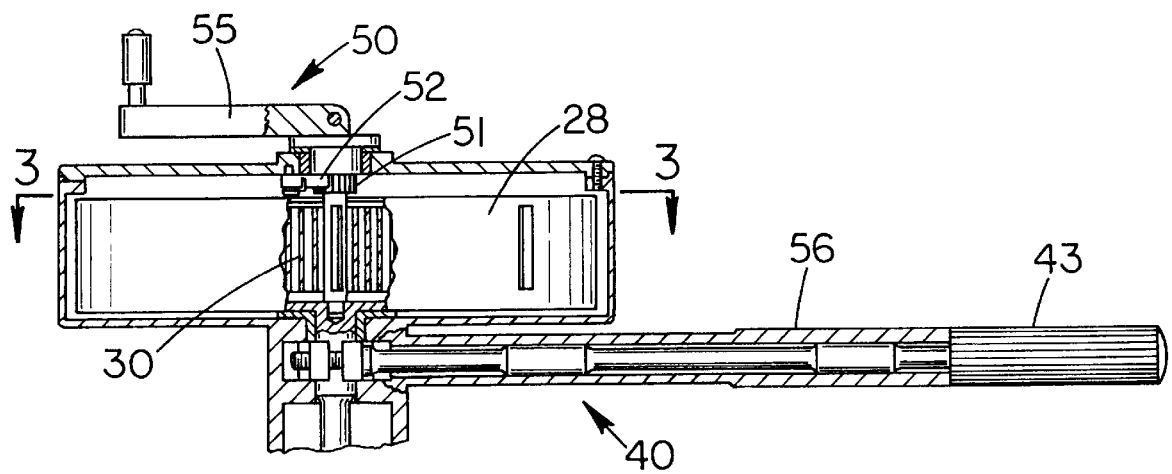
FIG. 2 is a partial cut-away side view of the present invention.
Figure 3:
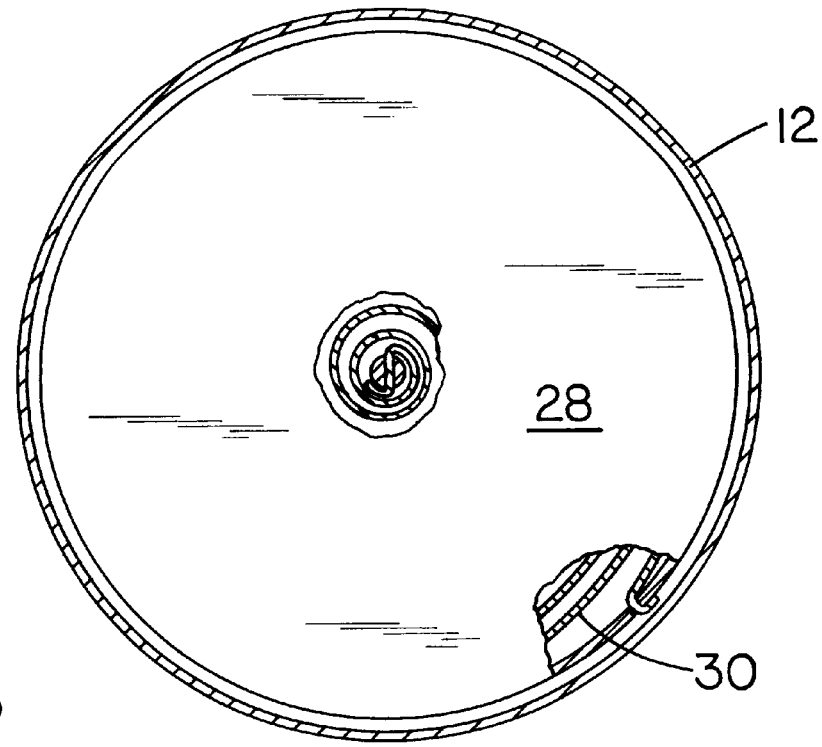
FIG. 3 is a partial cut away view of the drum and spring of the present invention taken along line 3—3 of FIG. 2.
Figure 4:
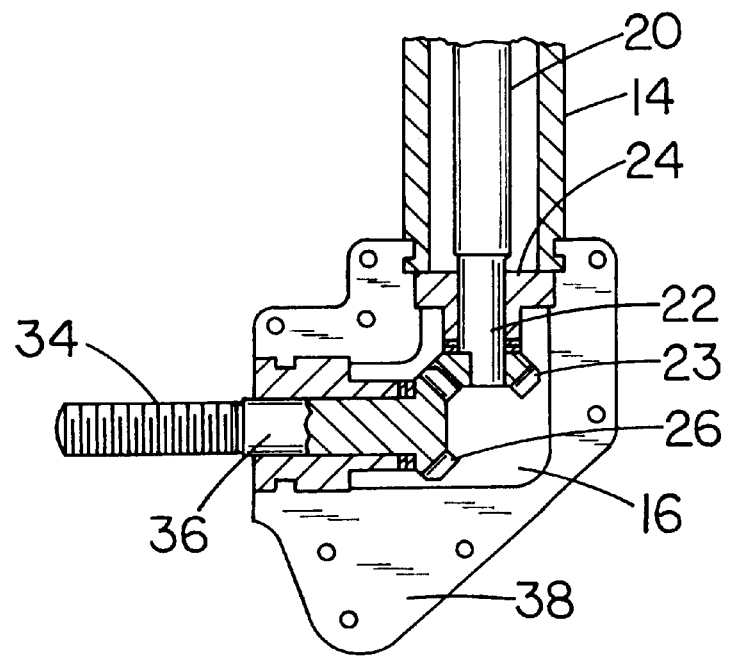
FIG. 4 is a cross-sectional view taken along line 4—4 of FIG. 1.
Figure 5:
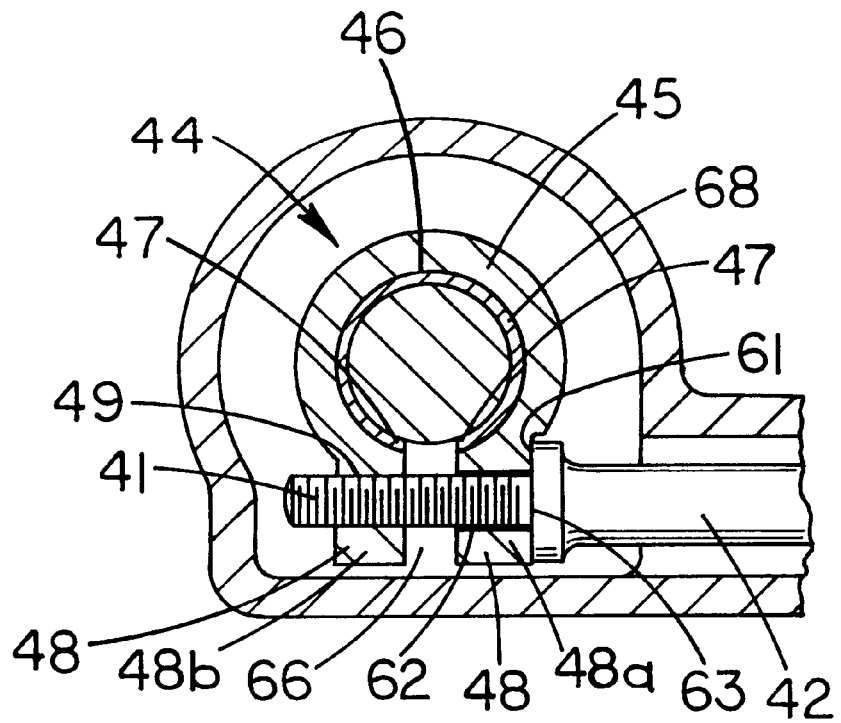
FIG. 5 is a cross-sectional view of the present invention taken along line 5—5 of FIG. 1.
Figure 6:
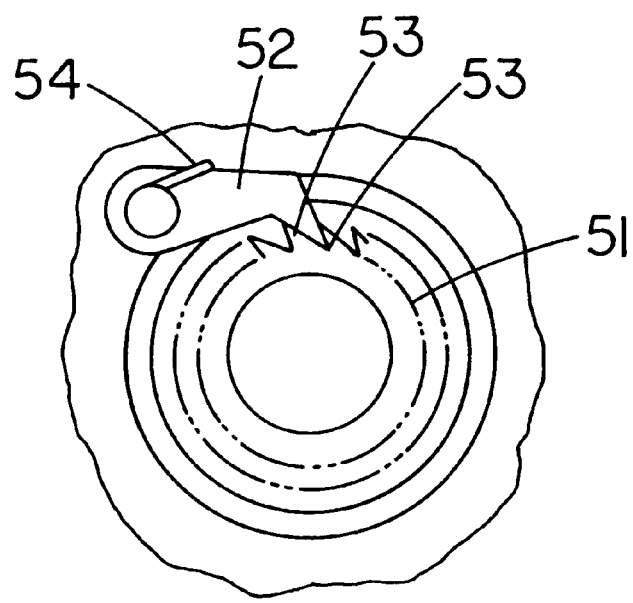
FIG. 6 is a top view of the catch mechanism and gear of the crank assembly of the present invention.

With reference now to the drawings, and in particular to FIGS. 1 through 6 thereof, a new nonresonant boat motor embodying the principles and concepts of the present invention and generally designated by the reference numeral 10 will be described.

As best illustrated in FIGS. 1 through 6, the nonresonant boat motor 10 generally comprises a drive shaft 20, a spring member 30 for rotating the drive shaft 20, a crank assembly 50 for imparting tension to the spring member 30, and a drive shaft rotation control assembly 40 for altering the speed of rotation of the drive shaft 14.

A drive shaft housing 14 is coupled to a spring housing 12 enclosing the spring member 30. The drive shaft 20 is connected to the spring member 30 to permit the drive shaft 20 to project from the spring housing 12 through the drive shaft housing 14. The drive shaft 20 is supported for rotation about a longitunial axis of the drive shaft 20.

The spring member 30 is radially expansive, substantially circular in configuration, and is positioned within the spring housing 12.

The drive shaft rotation control assembly 40 is coupled to the drive shaft housing 14 and is designed for selectively engaging the drive shaft 20 so that rotation of the drive shaft 20 is restricted by the drive shaft rotation control assembly 40 when the drive shaft rotation control assembly 40 engages the drive shaft 20. The drive shaft rotation control assembly 40 is designed to be adjustable for selectively varying the speed of rotation of the drive shaft 20. The drive shaft rotation control assembly 40 is most preferably designed for completely preventing rotation of the drive shaft 20 when the drive shaft rotation control assembly 40 is fully engaged to the drive shaft 20.

The drive shaft 20 is operationally connected to a propeller shaft 36 to rotate a propeller to move the boat.

The crank assembly 50 is coupled to the crank assembly 50 and includes a catch mechanism 52 coupled to the spring housing 12 for preventing the crank assembly 50 from rotating in a first direction. However, the crank assembly 50 is rotatable in a second direction opposite the first direction to impart tension in the spring member 30 when the drive shaft rotation control assembly 40 is engaged to the drive shaft 20. Because the crank assembly is prevented from moving in the first direction, the spring member 30 urges the drive shaft 20 to rotate in the first direction when the drive shaft rotation control assembly 40 is disengaged from the drive shaft 20.

The drive shaft rotation control assembly 40 includes an elongated control shaft 42 having a handle end 43 and a threaded end 41 opposite the handle end 43. The drive shaft rotation control assembly 40 also includes a generally C-shaped clamp member 44 having a circular portion 45. The circular portion 45 has an inward face 46 and two opposing ends 47 forming a gap 66 therebetween. The inward face 46 of the circular portion 45 has a frictional surface 68 applied thereto for engaging the drive shaft 20. The clamp member 44 further includes a pair of flanges 48, each flange 48 extending from a respective one of the opposing ends 47. A first one of the pair of flanges 48A has a duct 62 therein for receiving the threaded end 41 of the control shaft 42 therethrough and a second one of the pair of flanges 48B has a threaded aperture 49 for threadedly engaging the threaded end 41 of the control shaft 42. The first flange 48A further has a bearing face 61 opposite the second flange 48B for abutting a bearing lip 63 of the control shaft 42. The bearing lip 63 is positioned adjacent the threaded end 41 and is held against the bearing lip 63 by tension in the circular portion 45 when the threaded aperture 49 is engaged by the threaded end 41. Thus the size of the gap 66 is adjustable by rotating the control shaft 42 resulting in variable friction between the frictional surface 68 and the drive shaft 20.

The crank assembly 50 further includes a gear 51 operationally coupled to the spring member 30. The gear 51 has a plurality of teeth 53 positioned around a periphery of the gear 51. A catch mechanism 52 is coupled to the spring housing 12 for engaging the plurality of teeth 53 such that the gear 51 is prevented from rotating in the first direction when the catch mechanism 52 engages the teeth 53.

A catch biasing member 54 is coupled to the spring housing 12 for biasing the catch mechanism 52 into engagement with the teeth 53. A crank handle 55 is coupled to the gear 51 for rotating the gear 51 in the second direction such that tension is produced in the spring member 30 when the drive shaft rotation control assembly 40 is fully engaged to the drive shaft 20.

A control shaft housing 56 surrounds a medial portion of the control shaft 42 leaving a distal end of the control shaft exposed. A mounting bracket 58 is designed for coupling the motor 10 to the stern of the boat. The mounting bracket 58 is rotationally coupled to the drive shaft housing 14 such that the drive shaft housing 14 is free to rotate substantially about a longitudinal axis of the drive shaft housing 14. The control shaft housing 56 is fixedly coupled to the drive shaft housing 14 so that the propeller shaft 36 is designed for selective positioning to steer the boat by manipulating the control shaft 42.

A gear end 22 of the drive shaft 20 opposite the spring member 30 passes through a self-lubricating bearing 24 and has a beveled gear 23 operationally meshed to a beveled propeller shaft gear 26 for rotating the propeller shaft 36.

In a most preferred embodiment, a top portion of the drive shaft 20 extends into the spring housing 12 and is configured to form a drum 28 around the spring member 30. The spring member is then coupled to a slot in the drum 28.

A gear housing 16 encloses the gear end 22 of the drive shaft 20 and a portion of the propeller shaft 36. A propeller engagement portion 34 of the propeller shaft 36 extends outwardly from the gear housing 16 for attachment to a conventional propeller.

It is most preferred that the gear housing 16 includes a planar rudder portion 38 extending outwardly from the gear housing 16 for facilitating steering of the boat.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A nonresonant spring-powered motor system comprising:

a spring housing;

a drive shaft housing coupled to said spring housing;

a drive shaft projecting from the spring housing through the drive shaft housing, said drive shaft being supported for rotation about a longitunial axis of the drive shaft;

a radially expansive spring member of a substantially circular configuration being positioned within the spring housing, said spring member being connected to the drive shaft;

a drive shaft rotation control assembly coupled to the drive shaft housing, said drive shaft control assembly being for selectively engaging the drive shaft whereby rotation of said drive shaft is restricted by said drive shaft rotation control assembly when said drive shaft rotation control assembly engages said drive shaft;

a propeller shaft operationally coupled to said drive shaft;

a crank assembly coupled to said spring housing;

a catch mechanism coupled to the spring housing for preventing said crank assembly from rotating in a first direction; and said spring member being coupled to said crank assembly, said crank assembly being rotatable in a second direction opposite said first direction to impart tension in said spring member when said drive shaft rotation control assembly is engaged to said drive shaft, whereby said spring member urges said drive shaft to rotate in said first direction when said drive shaft rotation control assembly is disengaged from the drive shaft.

2. The nonresonant spring-powered motor system of claim 1, said drive shaft rotation control assembly comprising:

an elongated control shaft having a handle end and a threaded end opposite said handle end;

a generally C-shaped clamp member, said clamp member having a circular portion, said circular portion having an inward face and two opposing ends forming a gap therebetween, said clamp member further having a pair of flanges, each flange extending from a respective one of said opposing ends, a first one of said pair of flanges having a duct therein for receiving said threaded end of said control shaft therethrough, a second one of said pair of flanges ahving a threaded aperture for threadedly engaging said threaded end of said control shaft;

said first flange further having a bearing face opposite said second flange for abutting a bearing lip of said control shaft adjacent said threaded end, said bearing face being held against said bearing lip by tension in said circular portion when said threaded aperture is engaged by said threaded end, whereby a size of said gap is adjustable by rotating said control shaft;

said inward face of said circular portion having a frictional surface applied thereto for engaging said drive shaft when said gap in said circular portion is reduced by rotation of said control shaft.

3. The nonresonant spring-powered motor system of claim 1, wherein said crank assembly further comprises:

a gear operationally coupled to said spring member, said gear having a plurality of teeth positioned around a periphery of said gear; and a catch mechanism being coupled to said spring housing for engaging said plurality of teeth such that said gear is prevented from rotating in said first direction when said catch mechanism engages said teeth;

a catch biasing member coupled to said spring housing for biasing said catch mechanism into engagement with said teeth;

a crank handle coupled to said gear for rotating said gear in said second direction whereby tension is produced in said spring member when said drive shaft rotation control assembly is fully engaged to said drive shaft.

4. The nonresonant spring-powered motor system of claim 2, further comprising:

a control shaft housing surrounding a medial portion of said control shaft, said control shaft housing being fixedly coupled to said drive shaft housing; and a mounting bracket adapted for coupling to a stern of a boat, said mounting bracket being rotationally coupled to said drive shaft housing such that said drive shaft housing is free to rotate substantially about a longitudinal axis of the drive shaft housing, whereby said propeller shaft is adapted for selective positioning to steer the boat by manipulating said control shaft.

5. The nonresonant spring-powered motor system of claim 1, further comprising:

a gear end of said drive shaft opposite said spring member passing through a self-lubricating bearing, said gear end having a beveled gear operationally meshed to a beveled propeller shaft gear for rotating said propeller shaft.

6. The nonresonant spring-powered motor system of claim 1, further comprising:

a top portion of said drive shaft extending into said spring housing, said top portion being configured to form a drum around said spring member, said spring member being coupled to said drum.

7. The nonresonant spring-powered motor system of claim 5, further comprising:

a gear housing enclosing said gear end of said drive shaft and a portion of said propeller shaft, a propeller engagement portion of said propeller shaft extending outwardly from said gear housing.

8. The nonresonant spring-powered motor system of claim 7, further comprising:

said gear housing having a planar rudder portion extending outwardly from said gear housing for facilitating steering of the boat.

9. The nonresonant spring-powered motor system of claim 1, further comprising:

said drive shaft rotation control assembly being for preventing rotation of said drive shaft when said drive shaft rotation control assembly is fully engaged to said drive shaft.

10. A nonresonant spring-powered motor system comprising:

a spring member enclosed in a spring housing;

a crank assembly coupled to said spring member;

a drive shaft coupled to said spring member;

said crank shaft being for imparting tension to said spring member such that said spring member urges said drive shaft to rotate;

a drive shaft rotation control assembly for selectively engaging said drive shaft for varying rotational speed of said drive shaft;

said drive shaft being operationally coupled to a propeller shaft for rotating said propeller shaft;

an elongated control shaft having a handle end and a threaded end opposite said handle end;

a generally C-shaped clamp member, said clamp member having a circular portion, said circular portion having an inward face and two opposing ends forming a gap therebetween, said clamp member further having a pair of flanges, each flange extending from a respective one of said opposing ends, a first one of said pair of flanges having a duct therein for receiving said threaded end of said control shaft therethrough, a second one of said pair of flanges ahving a threaded aperture for threadedly engaging said threaded end of said control shaft;

said first flange further having a bearing face opposite said second flange for abutting a bearing lip of said control shaft adjacent said threaded end, said bearing face being held against said bearing lip by tension in said circular portion when said threaded aperture is engaged by said threaded end, whereby a size of said gap is adjustable by rotating said control shaft; and said inward face of said circular portion having a frictional surface applied thereto for engaging said drive shaft when said gap in said circular portion is reduced by rotation of said control shaft.

11. The nonresonant spring-powered motor system of claim 10, further comprising:

a control shaft housing surrounding a medial portion of said control shaft, said control shaft housing being fixedly coupled to said drive shaft housing; and a mounting bracket adapted for coupling to a stern of a boat, said mounting bracket being rotationally coupled to said drive shaft housing such that said drive shaft housing is free to rotate substantially about a longitudinal axis of the drive shaft housing, whereby said propeller shaft is adapted for selective positioning to steer the boat by manipulating said control shaft.

12. A nonresonant spring-powered motor system comprising:

a spring member enclosed in a spring housing;

a crank assembly coupled to said spring member;

a drive shaft coupled to said spring member;

said crank shaft being for imparting tension to said spring member such that said spring member urges said drive shaft to rotate;

a drive shaft rotation control assembly for selectively engaging said drive shaft for varying rotational speed of said drive shaft;

said drive shaft being operationally coupled to a propeller shaft for rotating said propeller shaft;

a gear operationally coupled to said spring member, said gear having a plurality of teeth positioned around a periphery of said gear;

a catch mechanism being coupled to said spring housing for engaging said plurality of teeth such that said gear is prevented from rotating in a first direction when said catch mechanism engages said teeth;

a catch biasing member coupled to said spring housing for biasing said catch mechanism into engagement with said teeth; and a crank handle coupled to said gear for rotating said gear in a second direction whereby tension is produced in said spring member when said drive shaft rotation control assembly is fully engaged to said drive shaft.

13. A nonresonant spring-powered motor system comprising:

a spring member enclosed in a spring housing;

a crank assembly coupled to said spring member;

a drive shaft coupled to said spring member;

said crank shaft being for imparting tension to said spring member such that said spring member urges said drive shaft to rotate;

a drive shaft rotation control assembly for selectively engaging said drive shaft for varying rotational speed of said drive shaft;

said drive shaft being operationally coupled to a propeller shaft for rotating said propeller shaft; and a top portion of said drive shaft extending into said spring housing, said top portion being configured to form a drum around said spring member, said spring member being coupled to said drum.

14. The nonresonant spring-powered motor system of claim 13, further comprising:

a gear end of said drive shaft opposite said spring member passing through a self-lubricating bearing, said gear end having a beveled gear operationally meshed to a beveled propeller shaft gear for rotating said propeller shaft.

15. A The nonresonant spring-powered motor system of claim 14, further comprising:

a gear housing enclosing said gear end of said drive shaft and a portion of said propeller shaft, a propeller engagement portion of said propeller shaft extending outwardly from said gear housing.

16. The nonresonant spring-powered motor system of claim 15, further comprising:

said gear housing having a planar rudder portion extending outwardly from said gear housing for facilitating steering of the boat.

17. The nonresonant spring-powered motor system of claim 13, further comprising:
said drive shaft rotation control assembly being for preventing rotation of said drive shaft when said drive shaft rotation control assembly is fully engaged to said drive shaft.

18. A nonresonant spring-powered motor system comprising:
a spring housing;
a drive shaft housing coupled to said spring housing;
a drive shaft projecting from the spring housing through the drive shaft housing, said drive shaft being supported for rotation about a longitunial axis of the drive shaft;
a radially expansive spring member of a substantially circular configuration being positioned within the spring housing, said spring member being connected to the drive shaft;
a drive shaft rotation control assembly coupled to the drive shaft housing, said drive shaft control assembly being for selectively engaging the drive shaft whereby rotation of said drive shaft is restricted by said drive shaft rotation control assembly when said drive shaft rotation control assembly engages said drive shaft;
a propeller shaft operationally coupled to said drive shaft;
a crank assembly coupled to said spring housing;
a catch mechanism coupled to the spring housing for preventing said crank assembly from rotating in a first direction;
said spring member being coupled to said crank assembly, said crank assembly being rotatable in a second direction opposite said first direction to impart tension in said spring member when said drive shaft rotation control assembly is engaged to said drive shaft, whereby said spring member urges said drive shaft to rotate in said first direction when said drive shaft rotation control assembly is disengaged from the drive shaft;
wherein said drive shaft rotation control assembly includes
an elongated control shaft having a handle end and a threaded end opposite said handle end,
a generally C-shaped clamp member, said clamp member having a circular portion, said circular portion having an inward face and two opposing ends forming a gap therebetween, said clamp member further having a pair of flanges, each flange extending from a respective one of said opposing ends, a first one of said pair of flanges having a duct therein for receiving said threaded end of said control shaft therethrough, a second one of said pair of flanges ahving a threaded aperture for threadedly engaging said threaded end of said control shaft,
said first flange further having a bearing face opposite said second flange for abutting a bearing lip of said control shaft adjacent said threaded end, said bearing face being held against said bearing lip by tension in said circular portion when said threaded aperture is engaged by said threaded end, whereby a size of said gap is adjustable by rotating said control shaft, and
said inward face of said circular portion having a frictional surface applied thereto for engaging said drive shaft when said gap in said circular portion is reduced by rotation of said control shaft;
wherein said crank assembly further includes
a gear operationally coupled to said spring member, said gear having a plurality of teeth positioned around a periphery of said gear,
a catch mechanism being coupled to said spring housing for engaging said plurality of teeth such that said gear is prevented from rotating in said first direction when said catch mechanism engages said teeth,
a catch biasing member coupled to said spring housing for biasing said catch mechanism into engagement with said teeth, and
a crank handle coupled to said gear for rotating said gear in said second direction whereby tension is produced in said spring member when said drive shaft rotation control assembly is fully engaged to said drive shaft;
a control shaft housing surrounding a medial portion of said control shaft, said control shaft housing being fixedly coupled to said drive shaft housing;
a mounting bracket adapted for coupling to a stern of a boat, said mounting bracket being rotationally coupled to said drive shaft housing such that said drive shaft housing is free to rotate substantially about a longitudinal axis of the drive shaft housing, whereby said propeller shaft is adapted for selective positioning to steer the boat by manipulating said control shaft;
a gear end of said drive shaft opposite said spring member passing through a self-lubricating bearing, said gear end having a beveled gear operationally meshed to a beveled propeller shaft gear for rotating said propeller shaft;
a top portion of said drive shaft extending into said spring housing, said top portion being configured to form a drum around said spring member, said spring member being coupled to said drum;
a gear housing enclosing said gear end of said drive shaft and a portion of said propeller shaft, a propeller engagement portion of said propeller shaft extending outwardly from said gear housing;
said gear housing having a planar rudder portion extending outwardly from said gear housing for facilitating steering of the boat; and
said drive shaft rotation control assembly being for preventing rotation of said drive shaft when said drive shaft rotation control assembly is fully engaged to said drive shaft.

* * * * *